July 2, 1968
D. S. FREEMAN
3,390,837
CONVERGENT-DIVERGENT PLUG NOZZLE HAVING A PLURALITY OF
FREELY-FLOATING TANDEM FLAPS
Filed Dec. 8, 1965
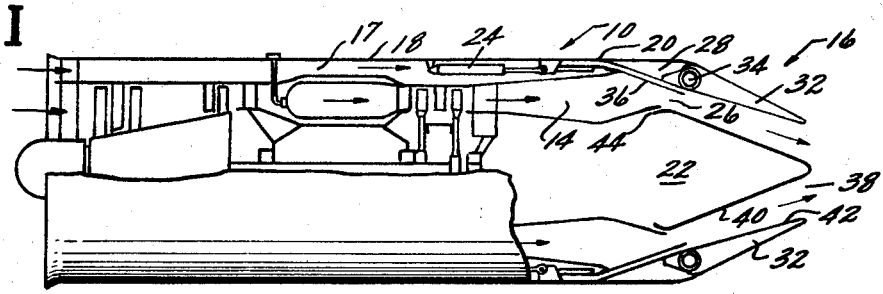
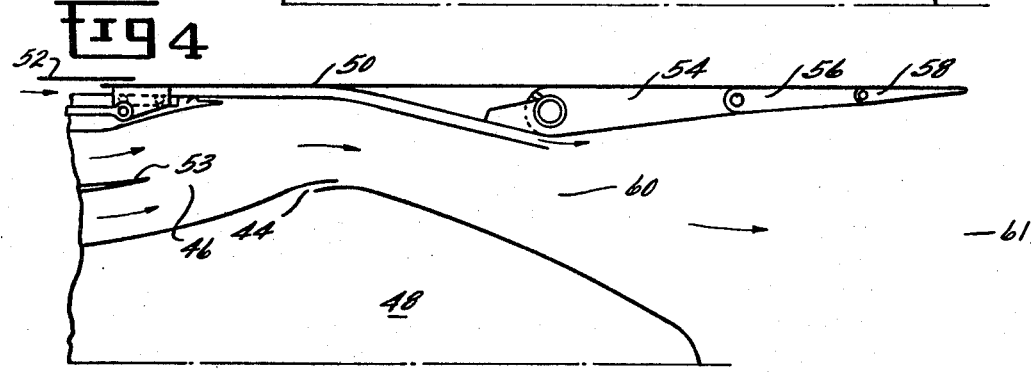
INVENTOR.
DONALD S. FREEMAN
BY
ATTORNEY

United States Patent Office 3,390,837
Patented July 2, 1968

3,390,837
CONVERGENT-DIVERGENT PLUG NOZZLE HAVING A PLURALITY OF FREELY-FLOATING TANDEM FLAPS
Donald S. Freeman, Cincinnati, Ohio, assignor to General Electric Company, a corporation of New York
Filed Dec. 8, 1965, Ser. No. 512,415
1 Claim. (Cl. 239—265.17)

ABSTRACT OF THE DISCLOSURE

The disclosure shows an annular convergent-divergent plug nozzle for use with a jet engine which comprises an inner exhaust gas duct having a plug spaced within the duct, a casing surrounding the duct having a portion movable axially to extend the duct. A plurality of peripherally spaced secondary flaps are pivotally connected to the end of the movable casing portion. Means are provided to move the casing and the flaps axially so that flaps freely float from their pivotal connection to assume a divergent nozzle position which is determined by the pressure differential across the flaps. The primary nozzle is formed between the casing and the plug, and a secondary nozzle is formed between the plug and the pivoted flaps, which secondary nozzle requires no actuating structure. A liner may be provided spaced inside the casing to act as an ejector and to duct cooling fluid across the inner surface of the secondary nozzle substantially at the throat of the primary nozzle. In a modification each flap may be made up of fingers in a plural, tandem and in an independently matching arrangement.

---

In high speed aircraft it is customary to use a variable geometry convergent-divergent nozzle for best operation at all speeds. Such a nozzle permits satisfactory operation at low pressure ratios occurring at subsonic speeds. Similarly, the nozzle may be opened up to operate as a convergent-divergent nozzle at high pressure ratios occuring at high supersonic speeds. The need for such a nozzle dictates operating structure which can assume many forms and become quite complex. A common nozzle that is used for such purposes is known as the plug nozzle. This comprises a nozzle in which a center plug is used in conjunction with one or more concentric tubes to form an annular outlet. The throat area of such a nozzle may be varied by either longitudinal movement of the plug or one or more of the tubes or both. The plural tube arrangement may be used in fan engines where by-pass air is employed. Alternately, a single tube with a slidable plug or a fixed plug with a slidable tube may be used or the plug may be varied radially permitting variation in throat area for operation at different conditions. In addition, such nozzles generally employ movable flaps for exit area variation and may employ primary and secondary flaps depending on the particular arrangement employed such as whether or not dry or afterburning operation or both is to be used. All of this requires actuating structure.

The main object of the present invention is to provide a convergent-divergent plug nozzle for a jet engine which nozzle uses freely floating secondary flaps to obviate the need for control and actuation mechanism.

Another object is to provide such a nozzle which will handle the excess engine bypass air in an ejector fashion for cooling as well as making use of the air or fluid to perform an operation elsewhere.

A further object is to provide such a nozzle that produces near optimum net positive thrust whether the exit is in small-area closed subsonic or open large-area supersonic position and/or whether the throat is in small-area non-afterburning or large-area afterburning position.

Another object is to provide such a nozzle that uses a translating shroud with a floating secondary so that the secondary nozzle always operates from a fixed pivot position.

Another object is to provide such a nozzle which may be modified to use several secondary fingers for better intermediate thrust coefficients.

Briefly stated, the invention is directed to an annular convergent-divergent plug nozzle for use with a jet engine which comprises an inner exhaust gas duct having a plug spaced within the duct, a casing surrounding the duct and having a portion movable axially to extend the duct. A plurality of peripherally spaced secondary flaps are pivotally connected to the end of the movable casing portion. Means are provided to move the casing and the flaps axially so that flaps freely float from their pivotal connection to assume a divergent nozzle position which is determined by the pressure differential across the flaps. The primary nozzle is formed between the casing and the plug and a secondary nozzle is formed between the plug and the pivoted flaps which secondary nozzle requires no actuating structure. A liner may be provided spaced inside the casing to act as an ejector and to duct cooling fluid across the inner surface of the secondary nozzle substantially at the throat of the primary nozzle. The casing forms its primary nozzle with the plug by virtue of a cone extension on the downstream end of the casing to end in a radially extending base where the secondary flaps are pivoted peripherally around the nozzle. In a modification each flap may be made up of fingers in a plural, tandem and in an independently matching arrangement. As will be apparent, the nozzle is not limited to a circular shape but may be of rectangular or other shapes. For simplicity, the invention is described in connection with the conventional circular type plug nozzle. However, such terms as "annular" and "plug" and "cone" are only intended to indictae a perimeter opening, a center body, and a cross-sectional shape in the general environmental arrangement of the unique nozzle described and claimed and to avoid a multiplicity of claims that are not really directed to the shroud-mounted free floating flap plug nozzle concept. Thus, such terms are not to be construed as limiting in the sense of circular only but are intended to cover all such obvious non-circular modifications.

While the specification concludes with such claims particularly pointing out and distinctly claming the subject matter which is regarded as the invention, it is believed the invention will be better understood from the following description taken in connection with the accompanying drawing, in which:

FIGURE 1 is a diagrammatic cross-sectional view of a typical turbojet engine employing the nozzle of the invention;

FIGURE 2 is an enlarged diagrammatic view of the nozzle in the dry and subsonic position with the nozzle closed;

FIGURE 3 is a view similar to FIGURE 2 showing the nozzle in the open position during afterburning and supersonic operation; and FIGURE 4 is a partial diagrammatic view of a modified plural finger nozzle applied to a fan engine.

Referring first to FIGURE 1, there is shown a typical diagrammatic view of a turbojet engine. Such an engine comprises the usual inlet, compressor, combustion and turbine sections all generally indicated at 10 in the well known manner. For ease of illustration, a straight turbojet type engine will be described although it will be apparent that the invention is applicable to a bypass fan type engine. The customary exhaust gases from such an engine 10 are directed through an inner exhaust gas duct 14 and are exhausted through a nozzle generally indicated at 16 to produce thrust. In the engine described a bypass or secondary duct 17 is provided by means of a casing or nacelle 18 which, for the purposes of the invention to be described, may obtain its air from any source as shown in FIGURE 1 or may be used to purge other parts of the engine or remove excess fluid wherever desired, such as for cooling. Thus, as an ejector, it assists the air to perform operations elsewhere. The nozzle throat area variation is obtained by portion 20 of casing 18 being positioned closely adjacent and being movable axially to extend the duct and form a nozzle with the duct.

In order to obtain thrust and form the remainder of the nozzle, nozzle 16 may include a concentric plug 22 that is spaced within the duct and operates in conjunction with the movable shroud portion or casing 20 to provide throat area variation in a known manner. Casing 20 is axially movable by actuation means 24 which may take any suitable form and is only generally shwon.

Referring next to FIGURE 2, it will be clear that axial movement of casing 20 will vary the throat 26 of the primary nozzle. This throat variation is obtained by providing the downstream end of casing 20 with a cone-like extension 28. It can be seen that the cone forms a contiguous extension of the casing to provide a smooth outer surface and it has a substantially radially inwardly extending base 30. As thus far explained, it will be apparent that axial movement of the casing 20 with the cone extension 28 cooperating with plug 22 provides a generally converging nozzle forming throat 26.

For additional control of the thrust fluid exiting from the primary nozzle and to form a convergent-divergent nozzle for supersonic speeds, a plurality of peripherally spaced secondary flaps 32 is provided. These flaps are pivotally connected to the movable casing 20 at the base 30 so that they substantially fill the radial extent of the base and thus provide a matching extending base so that the inner and outer surfaces of the flaps are smoothly continuous with the casing surfaces. Any suitable pivot means 34 may be used to attach the floating secondary flaps 32 to the base of the cone extension 28. The individual flaps are formed of a plurality of smoothly matching flaps peripherally arranged around the base and independently pivoted from the casing. It should be noted that no actuating structure is provided to operate flaps 32. In the case of the turbojet engine as shown in FIGURE 1, these flaps 32 are pivoted to the casing generally at the throat 26 as shown in FIGURES 2 and 3. It will be seen that the secondary flaps 32 thus control the expansion of exhaust gases for either subsonic or supersonic operation.

It may be desirable to radially space and provide an inner liner 36 so that secondary air may be injected or ejected to enter the discharge portion of the nozzle. This liner preferably extends downstream to the pivot point 34 and takes air from bypass duct 17 to bathe the inner surface of the secondary flap 32 with cool air. This secondary air may come from any suitable source and may even include air that has been used for purging, cooling, or inlet matching purposes upstream as noted. At this point, it is merely used to provide a cooling film over the inner surface of the floating secondary flaps 32.

At the subsonic operation shown in FIGURE 2, the nozzle operates at low pressure ratios. As a result of this operation, the internal area ratio, which is the ratio of the area at the exit 38 to the area at throat 26 must be kept fairly low. If the area ratio is too high, the low pressure ratio causes the pressures along the inner wall of secondary flaps 32 to be lower than the ambient pressures around the outer surface of secondary flaps 32. As as a result, there is a net closing force because of a positive pressure difference across the flaps 32. This occurs because the divergent passage between plug surface 40 and the inner surface 42 of flap 32 results in a low pressure in that area. Consequently, the secondary flaps 32 tend to close to the position shown in FIGURE 2. Thus, the secondary flaps assume the correct position for subsonic cruise as shown in FIGURE 2. Note that this is obtained with only one set of secondary flaps 32 and by having an actuator 24 only for the sliding portion 20 of the casing. The secondary flaps 32 merely float and assume the proper position by virtue of the pressure difference across them. Consequently, no complex actuating mechanism is required for efficient operation of the nozzle in the subsonic or cruise position of FIGURE 2.

Referring next to FIGURE 3, the nozzle is shown in its supersonic and afterburning position wherein a convergent-divergent nozzle is desired. The same numbers refer to the same parts. In this position of operation, the pressure ratios are much higher and it is desired that the area ratio also be increased. The result of the high pressure ratio is that the pressure on the inner surface of secondary flaps 32 is higher than ambient and the flaps float to the open or expanded position as shown in FIGURE 3. Again, no secondary flap actuating structure is required, no primary flaps are needed, and the nozzle assumes its correct operating position. Any suitable stop means not shown may be employed to limit the outer and/or inner movement of the flaps. Also, any conventional interconnecting means not shown to cause the flaps to move in unison may be employed. In either position of operation as shown in FIGURE 2 or FIGURE 3, no primary flaps are required and the consequent actuating mechanism is greatly simplified. Further, because of the extension of the base portion of the secondary flaps to match the cone extension on the sliding portion 20 of the casing, a smooth continuous surface is provided on both the outer and inner surfaces of flaps 32 to avoid any discontinuity in the flow.

Because of the relationship of the flaps 32 with the plug outer wall 40, there is an increase in net thrust in both positions of operation as shown in FIGURES 2 and 3. Referring to FIGURE 2 it will be seen that the flaps 32 will position themselves so that the external ambient pressure force is equal to internal jet pressure force acting on surface 42. This optimizes net thrust because base drag is minimized. Referring to FIGURE 3, it will be apparent that when the pressure on secondary flaps 32 at the inner surface 42 is higher than the external ambient pressure, the secondary flaps will tend to open until it reaches a stop position and an added net force vector (thrust) to the left will result. Thus, in both positions of the nozzle, there is a net thrust increase as will be apparent.

Since the nozzle described is generally intended for afterburning engines, although it is not so limited, generally liner 36 will be used in conjunction with a similar cooling opening 44 in the plug that may be used to direct a film of cool air across the wall 40 of the plug for cooling it. Thus, both surfaces 42 and 40 exposed to the high temperatures are film cooled.

Referring next to FIGURE 4, there is shown a modification that might be applied to either a fan or a turbojet engine. FIGURE 4 shows it applied to a fan engine although it will be obvious that it could be used in place of the structure shown in FIGURES 2 and 3. In this modification, duct 46 has a central plug 48 and slidable shroud portion 50 on casing 52 operating as previously described. A splitter 53 divides the outer fan flow and inner exhaust flow which flows are discharged through the nozzle. Because better intermediate thrust coefficients may be desired, it is possible to break up the flaps 32 previously described into a plurality of smoothly matching tandem and independently floating fingers or sets of flaps 54, 56 and 58 as shown. It will be apparent that this allows more flexibility and exit 61 may be pressure formed at the most efficient point of operation. Again, conventional stop means may be used on each set of the interconnected flaps. Again, the converging-diverging nozzle is movable to the general position described with respect to FIGURE 2 as well as the FIGURE 3 modification or, now, intermediate positions as determined by pressure differentials that may provide for better thrust coefficients.

It will be apparent that the invention employs a unique self-balancing nozzle arrangement employing only one set of freely floating secondary nozzle flaps wherein the nozzle streamlines the aft end of the engine as well as automatically positioning itself for most efficient opertaion at differing flight speeds and does this by a floating arrangement requiring no external actuating means. In conjunction with the sliding shroud portion the actuator and hardware are simple and straightforward and lightweight. In either mode of operation there is a net thrust gain and the invention may be modified by a plural finger flap arrangement for intermediate operation. Finally, all of the above is applicable to either a fan-type or straight turbojet-type engine.

While there have been described preferred forms of the invention, obvious modifications and variations are possible in light of the above teachings. It is therefore to be understood that within the scope of the appended claim the invention may be practiced otherwise than as specifically described.

I claim:

1. In a gas turbine engine, a propulsive nozzle, for a hot gas stream, comprising an inner plug, a concentric duct, and flap means forming an extension of said duct, said plug, duct and flap means defining an annular nozzle converging to a throat and diverging therebeyond, said plug being convergently tapered downstream of said throat, means for effecting relative longitudinal movement between said plug and said duct, characterized in that said flap means are freely floating and pivotal about axes approximately aligned with said throat when the duct is in an extreme upstream position, and the flap means have inner and outer surfaces of essentially equal areas exposed respectively to the hot gas stream and ambient atmospheric conditions, whereby the flap means, in subsonic flight, are disposed convergently with respect to each other and form in combination with the plug a flow path of minimum divergence for the hot gas stream, and at supersonic flight speeds are displaced outwardly to be divergent with respect to each other and form a flow path of maximum divergence, with respect to said plug, for said hot gas stream, and the downstream end portion of the duct is relatively movable and the flap means are pivotally attached to said relatively movable portion, and means are provided for displacing said movable portion to control the area of said throat, and the movable portion of said duct has a convergent throat portion defining in combination with said plug the nozzle throat, characterized in that said flap means comprise a plurality of tandem flaps.

References Cited

UNITED STATES PATENTS

| | | | |
|---|---|---|---|
| 2,569,996 | 10/1951 | Kollsman | 239—265.11 |
| 2,928,235 | 3/1960 | Johnson | 239—265.33 X |
| 2,971,327 | 2/1961 | Moy et al. | 239—265.19 X |
| 3,028,730 | 4/1962 | Clark | 239—265.41 X |
| 3,048,973 | 8/1962 | Benedict | 239—265.39 X |
| 3,049,875 | 8/1962 | Horgan | 239—265.39 |
| 3,057,150 | 10/1962 | Horgan | 239—265.41 |

M. HENSON WOOD, JR., *Primary Examiner.*

V. M. WIGMAN, *Assistant Examiner.*